Nov. 30, 1937.  C. M. BRENNER  2,100,939
HAND TOOL FOR MAKING JOINTS ON TUBULAR MEMBERS
Filed Jan. 25, 1937
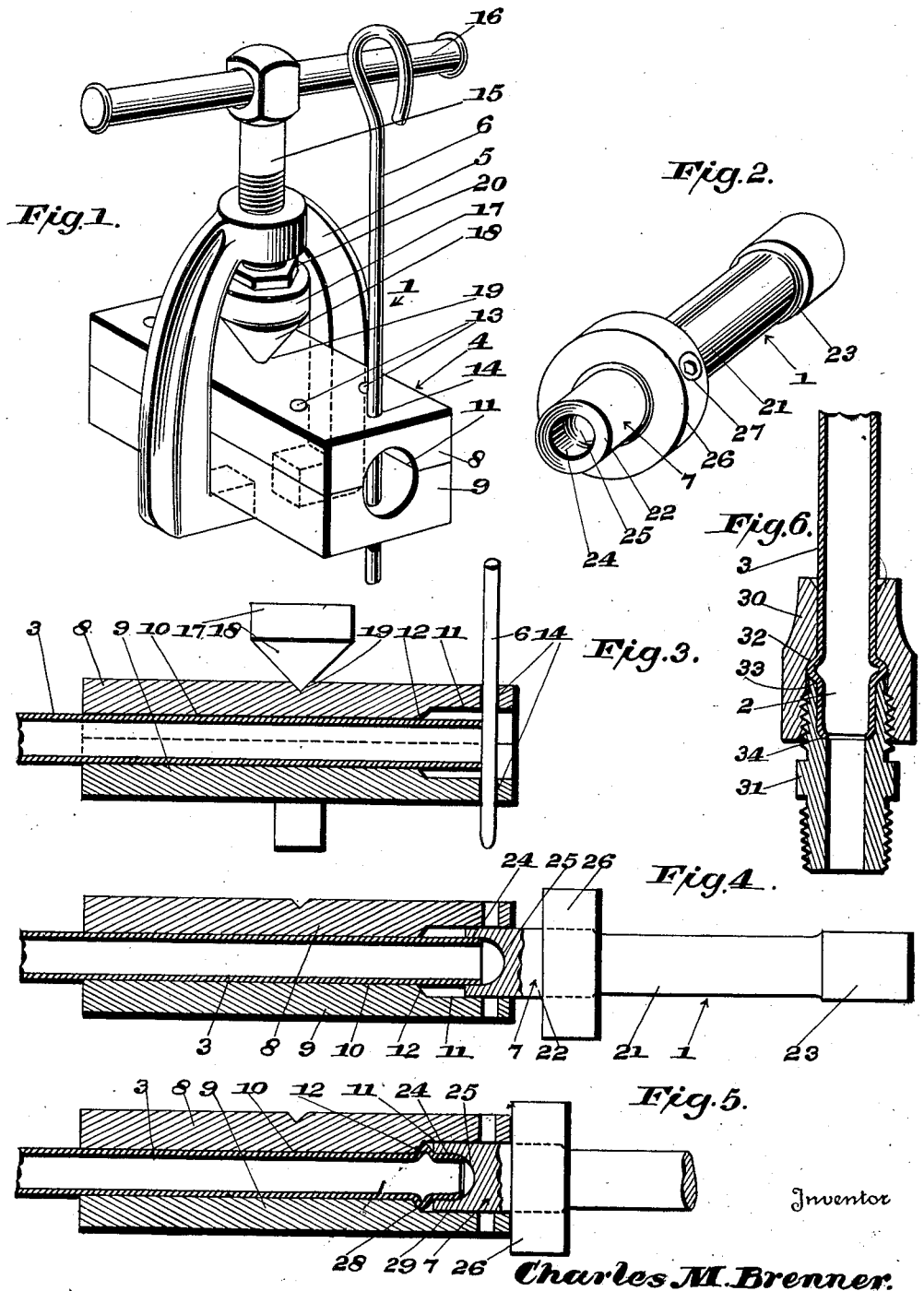
Inventor
Charles M. Brenner.
By Munn, Anderson & Liddy
Attorneys Patented Nov. 30, 1937

2,100,939

UNITED STATES PATENT OFFICE 2,100,939

HAND TOOL FOR MAKING JOINTS ON TUBULAR MEMBERS

Charles M. Brenner, Shreveport, La.

Application January 25, 1937, Serial No. 122,306

1 Claim. (Cl. 153—79)

This invention relates to improvements in joint-forming tools, and its objects are as follows:

First, to provide a hand tool for making joints on tubular members, wherein the upsetting member serves the combined purposes of a forming die and a pilot, thereby avoiding the need of an arbor or mandrel as customarily used.

Second, to counterbore the tubing hole in the vise so as to make it serve both as the upsetting recess and guide for the die-pilot.

Third, to use an adjustable collar on the forming die to enable making the joints in various shapes and lengths.

Fourth, to provide a vise with holes for the insertion of a gage pin which is used to insure uniformity in the making or positioning of the joints.

Other objects and advantages will appear in the following specification, reference being had to the accompanying drawing, in which:

Figure 1 is a perspective view of the assembled vise, yoke and gage pin,

Figure 2 is a perspective view of the forming die,

Figure 3 is a diagrammatic sectional view illustrating the initial use of the gage pin, Figure 4 is a similar view illustrating the position of the forming die before hammered thereon, Figure 5 is a similar view illustrating the completion of the joint at the end of the hammer operation, and Figure 6 is a sectional view illustrating the use of the joint in a coupling.

This invention is an improvement on Patent 1,955,356 granted to C. M. Brenner on April 17, 1934. The purpose of the instant invention is to enable making by hand a joint of the type disclosed in Patent 1,858,136 granted to C. M. Brenner on May 10, 1932. The machine of the first-named patent has its particular value in the rapid production of a large number of joints. The instant invention is intended for hand operation wherein speed is not a prerequisite. Said latter invention also embodies a number of simplifications and improvements, all of which are now set out.

Attention is directed to the drawing. The combined tool is commonly designated 1 in Figs. 1 and 2. The parts here shown constitute an assemblage which work together in the production of what is herein known as a joint. This joint is commonly designated 2 (Fig. 6), and it is formed on the end of a tubing 3. Those parts of the tool shown in Fig. 1 comprise the vise 4, yoke 5 and gage pin 6. The companion part shown in Fig. 2 comprises the forming die 7.

The vise 4 consists of a pair of jaws 8, 9 which are entirely separate members, and necessarily so in order to enable their assemblage around the tubing 3 (Fig. 3) preparatory to making the joint. These jaws have complemental formations on their confronting faces which, when assembled, define the tubing hole 10 and a counterbore 11. The place of mergence of the counterbore with the hole is a simple beveled seat 12, this merely being the shape left by the drill which made the counterbore.

Positioning pins 13 insure the correct assemblage of the jaws 8, 9. These pins are supplied in as large a number as may be thought necessary. The number of pins will be increased with the size of the vise, and the latter will be governed by the size of tubing to be worked upon. The present showing is based on the use of four pins. These are fixed in one of the jaws in any suitable way, and project therefrom in order to fit in matching holes in the other jaw.

Matching transverse holes 14 in the two jaws enable the temporary insertion of the gage pin 6 near the entrance to the counterbore 11. This pin is inserted preparatory to the forming step so as to stop the tubing 3 (Fig. 3) in the proper position in the counterbore 11. All tubing sections will be stopped at the same place, thus insuring uniformity of the joints 2. The gage pin is then withdrawn and the yoke is made tight.

Said yoke includes a pressure screw 15 with a handle 16 for its operation. The head 17 of the pressure screw is beveled at 18, and the point of the bevel seats in a shallow recess 19 in one or the other of the jaws. The head 17 has a swivel connection 20 to the pressure screw.

The forming die comprises a cylindrical rod 21 which has enlargements 22, 23 at its opposite ends. The enlargement 23 is intended to be hammered upon. The enlargement 22 constitutes the actual die and pilot. It is axially recessed at 24 to provide a die cavity. The bottom of the cavity is rounded at 25, although here the shape may be that of a bevel. A collar 26 is fitted on the enlargement 22. It is firmly set in place by two or more screws 27. These screws are intended to be loosened in order to adjust the collar on the enlargement 22 and thus enable making joints of various shapes and lengths.

The operation of the tool is readily understood. The jaws 8, 9 are assembled around the tubing 3 (Fig. 3), the positioning pins 13 insuring the proper fitting together of the jaws. The gage pin 6 is inserted, and the end of the tubing is butted against the gage pin. The clamp, comprising the yoke 5 and pressure screw 15, is then tightened, and the gage pin 6 is withdrawn.

In Figs. 4 and 5 the jaws 8, 9 are understood to be tightly clamped upon the tubing 3. The forming die 7 is now presenting at the counterbore 11. It has an easy sliding fit in the counterbore. A few initial taps on the hammer upon the enlargement 23 drive the die cavity 24 upon the tip of the tubing 23. As soon as the tip of the tubing reaches the beginning of the round portion 25 the die so jams upon the tubing as to carry the end of the tubing with it during the subsequent hammer strokes.

It requires only a few taps of the hammer upon the enlargement 23 to upset the tubing into the flange formed at 28 (Fig. 5). The operation is finished when the collar 26 touches the end of the vise. During the foregoing strokes of the hammer the tip of the tubing is crowded into the rounding 25 to some extent, and the corresponding rounding 29 of the tubing tip eventually forms part of one of the seats in the ultimate coupling in Fig. 6.

It will be understood from what has been stated, that the forming die 7 serves the combined purposes of a forming die by virtue of the die cavity 24 that it contains and of a pilot because of the sliding fit that it has in the counterbore 11. This arrangement avoids the need of an arbor or mandrel to guide the forming die. The particular illustrated position of the collar 26 produces a moderately rounded cross section of the flange 28.

A slight adjustment of this collar one way or the other on the enlargement 22 will change the shape of the joint 2 (Fig. 6). By setting the collar 26 a little farther to the right, more hammer blows will be required to bring the collar up to the end of the vise and the flange 28 will be driven together more thinly as the consequence. If the collar is set up a little toward the left the resulting flange will be fuller in cross section than shown.

According to the set-up here shown, the position of the flange 28 with respect to the end of the tubing, and the length of the tubing tip itself, will always be substantially the same, the only variation occurring when slight adjustments are made in the position of the collar 26 as just explained. But it is within the province of the invention to enable making material variations in the position of the flange and in the resulting length of the tip. All that is necessary to do is to change the depth of the die cavity 24, 25 in the forming die 7 and the depth of the counterbore 11 in the end of the vise 4. By making the cavity and counterbore more shallow, a shorter tip will be the result. By making them deeper a longer tip will result. In other words the flange 28 can be upset anywhere from one-sixteenth of an inch to four or five inches from the end of the tubing. Every size of tubing requires a joint-forming tool of its own, the hole 10 (Fig. 3) being adapted to take only one size.

Mention has just been made of making the cavity 24 more shallow. The rounded bottom does not have to be adhered to. This bottom can be made perfectly flat, and if it is flat instead of concave, the tip of the joint will be straight and not slightly rounded, as in Figs. 5 and 6. In other words, the shape of the tip is controlled by the shape of the bottom 25. If the latter is flat the tip will not be restricted by the slight rounding at 34 (Fig. 6). Each of the various possible formations of the bottom 25 has its advantages, and any desired bottom formation is intended to be adopted according to needs.

Briefly referring to Fig. 6, the coupling is completed by screwing the members 30, 31 together. These are internally formed to produce first, second and third seats 32, 33, and 34. The joint 2 is shaped to conform to the interior of the screw members and, as already pointed out, it is the purpose of the invention to enable making the complemental joint 2 simply, quickly, and cheaply, and on the job.

I claim:

A tool to upset a piece of tubing at a determined distance from one end thereof, comprising jaws with a bore to grip said piece of tubing, said bore having a counterbore terminating in an internal seat which merges directly with the bore, said jaws having gauge pin holes leading into the counterbore, a gauge pin temporarily insertable in said holes crosswise of the counterbore to accurately fix the position of the tubing tip with reference to the seat, a forming die having its working end fitted in the counterbore and having a cylindrical die cavity fitting the tip and beginning at the perpendicular working end, the bottom of said cavity comprising an abutment to push the tubing tip so that it is outwardly crimped at the edge of the cylindrical die cavity and is formed against said internal seat, a collar on the forming die, and means to adjustably fix the position of said collar so as to regulate the size of the space between the working end and seat in which space the crimped and formed portion is expanded into a circular bead.

CHARLES M. BRENNER.